June 29, 1926.
W. J. FISK
1,590,569
ELECTRIC DISTRIBUTING SYSTEM
Filed Jan. 17, 1922    2 Sheets-Sheet 2
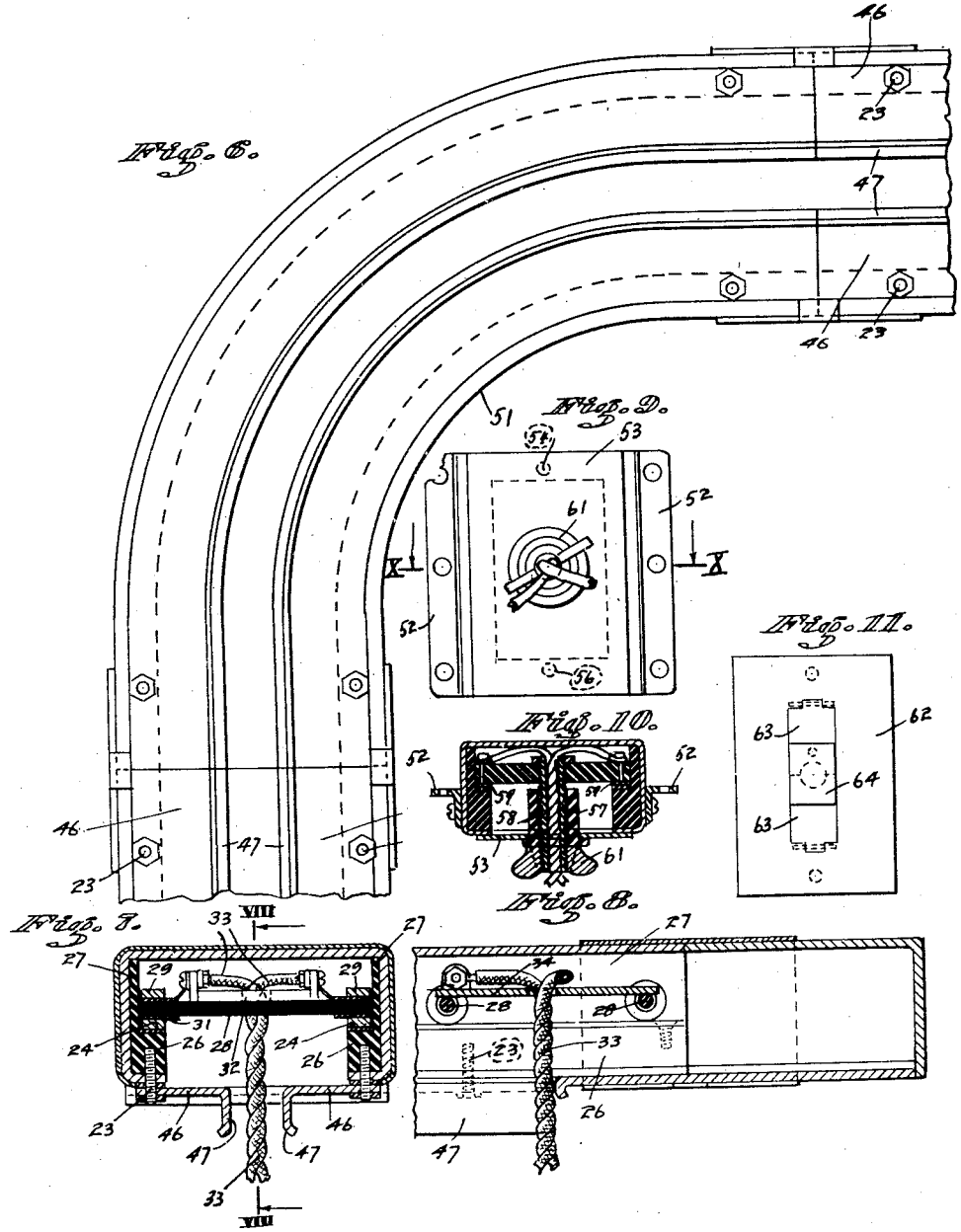
INVENTOR.
WILLIAM JAMES FISK
BY 
ATTORNEYS.

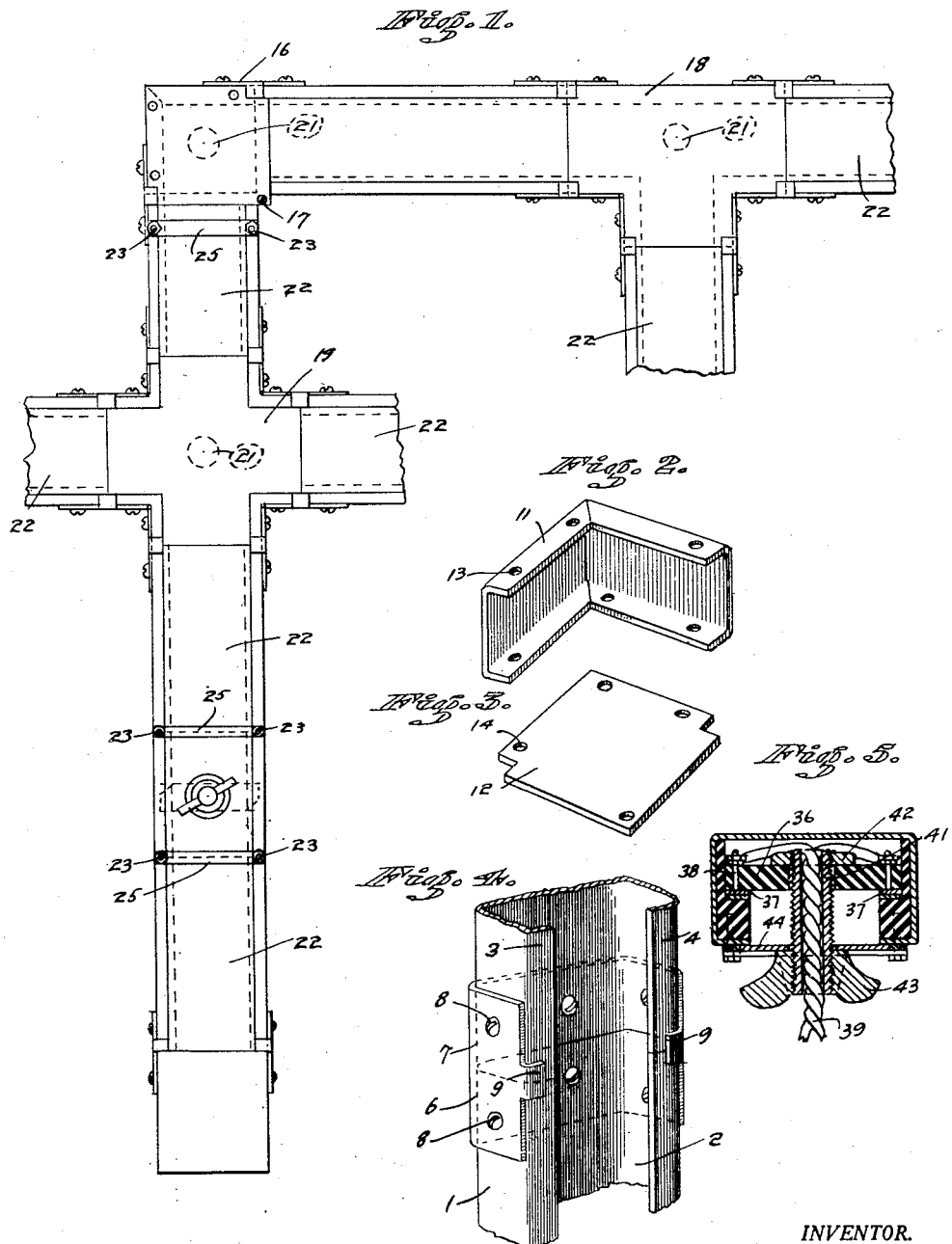

Patented June 29, 1926.

1,590,569

UNITED STATES PATENT OFFICE.

WILLIAM JAMES FISK, OF SAN FRANCISCO, CALIFORNIA.

ELECTRIC DISTRIBUTING SYSTEM.

Application filed January 17, 1922. Serial No. 529,833.

The present invention relates to improvements in electric distributing systems and its particular object is to provide a system of the character described that will readily adapt itself to a plurality of uses. It is proposed, for instance to provide a system that may be used for molding and is at the same time adapted to receive any desired number of connecting units in practically any desired position. Where my system is installed it will be possible to readily connect a plurality of current requiring devices interchangeably. A further object of my invention is to provide means whereby small trucks travelling on wheels may be used as means for connecting electrical devices, such as lamps for instance to the line circuit so that the lamps may be freely moved about. Other advantages of my system will appear as the description proceeds.

With these objects in view I have illustrated the preferred form of my invention in the accompanying drawings in which Figure 1 illustrates a portion of my system which may be considered as being embedded in either the walls or the ceiling of a room, Figure 2 a detail view of an L-shaped member used as a connection in corners, Figure 3 a plate used in connection with the L-shaped member of Figure 2, Figure 4 a joint between two of the units composing my system, Figure 5 a connecting unit illustrating the connection between the line and any desired electrical appliances, Figure 6 a bottom plan view of a portion of my system as embedded in the ceiling showing a corner unit, Figure 7 showing a detail sectional view of a connecting means between the line and an electrical appliance allowing of longitudinal motion of the latter, Figure 8 a cross-section along line 8—8 of Figure 7, Figure 9 a detail view of a unit that may be used independently, Figure 10 a cross-section through the same along line 10—10 of Figure 9 and Figure 11 a detail view of a plate to be used in connection with the unit illustrated in Figure 9. While I have illustrated only the preferred forms of my invention it will be readily understood that various changes or modifications may be made within the scope of the claims hereto attached without departing from the spirit of the invention.

The principal unit of my device is the slotted tube (1). In the following description as well as in the claims I shall refer to this member as a tube although I prefer to have the same of rectangular cross-section. This tube is embedded in the wall or ceiling of a room in such a manner that its slot (2) faces the room, the outer face of the slot defining edges (3) and (4) being disposed substantially flush with the ceiling or the wall respectively. A plurality of these units are joined together so as to form a continuous line which is preferably carried all over the ceiling and down the wall or along the wall to any place from which it is deemed desirable to take electric power. I show a plurality of different joints corresponding to the different demands that may be made. The simplest means of joining two units is shown in the bond (6) in Figure 4 which simply consists of a broad band (7) overlapping the two units to be joined and secured to both units by means of screws (8) or in any other feasible manner. I prefer to have the full width of the band extend around only three sides of my tube while the fourth side facing the room is covered by small clips (9) as shown in the drawing. Where two units have to be joined at an angle as for instance in the upper corner of Figure 1. I preferably use the joint illustrated in Figures 2 and 3 comprising the L-shaped member (11), corresponding top and bottom plates (12) secured to the L-shaped member by means of suitable bolts penetrating registering perforations (13) and (14), suitable bands (16) being used to cover the joints. The latter bands (16) are somewhat similar in shape to the band (7), the only difference being that they are shortened to adapt themselves to the shape of the corner unit. The plates (12) extend in their inner corners slightly beyond the units joined by the same and are permanently secured to each other by means of extra bolts penetrating registering perforations (17) provided in the inner corners of the plates. In a similar manner three-way units (18) are provided where it is desired to join tubes leading into three different directions and four-way units (19) where four directions are to be covered. The joining members in the three and four-way units do not present any features different from those described thus far.

Suitable openings (21) are provided in the different joints for the admission of the line wires into the same. As previously stated, these tubes are carried along the ceiling as well as along the walls of the room which it is desired to connect. If my system is to be used as a molding only, the slot (2) is covered up by means of a plate (22). This plate is slightly larger than the width of the slot and extends from one clip (9) to the other so as to be flush with the same and may be secured to the edges of the slot by any suitable means such as the strips (25) and the screws (23) shown in the drawing.

For distributing power from the line I use two different means. Both means are characterized by the providing of two rails (24) in connection with each tube. The rails rest on the margins bounding the slot but a heavy layer of insulating material (26) is interposed between the rails and the margins of the tube and secured in that position by means of suitable screws (23) and a marginal portion (27) of the insulating material is carried upward so that rails which are made of conducting material are insulated from the tube, the latter being also made of conducting material such as sheet metal and being properly grounded. We have therefore as far as the tubular system goes two parallel rails inside of the same each of them being connected to one of the line wires.

From these rails I take my power in one of two ways. Where the rails are disposed in the ceiling I preferably use the device illustrated in Figure 7 which comprises a carriage (28) consisting of two metal wheels (29) rotating on metal bushing (31) secured to an axle (32) made of insulating material. One of the wheels rides on each rail and from each bushing (31) extends a wire (33) the two wires leading downwardly and having a desired fixture such as a lamp attached thereto. It may of course be found more convenient to use instead of one axle two axles and four wheels as indicated in Figure 8 in order to increase the stability of the device. In the latter case any suitable means such as the plate (34) may be used to join the two axles. It will be seen that a light fixture connected with the carriage can be conveniently pulled through the whole room which is especially important in big stores where a plurality of these lights might be provided for each aisle and can be conveniently moved at any time to any place desired.

The tubes associated with the walls could of course not be used in the same manner. These tubes are equipped with the same rails but instead of a carriage I use a transverse member (36) of insulating material provided with contact plates (37) engaging the rails as shown in Figure 5, the contact plates being connected by suitable means such as the bolts (38) with the wires (39) leading to the fixture to be supplied. The transverse member (36) is held in firm contact with the rails by means of a threaded sleeve (41) having a head (42) resting against the transverse member and being adapted to receive the wing nut (43) which latter bears against a second transverse member (44) disposed on the outside of the tube. The wires (39) are carried through the sleeve. This device is principally used where it is desired to feed electric appliances such as small motors from the line. Any number of them may be used at the same time since ample space is provided to receive them.

It is desirable of course that the slot in the tube be covered as much as possible without interfering with the proper use of the device. Where my tubes are used in the ceiling a continuous slot has to be provided of course, but in order to narrow the same after the carriage has been placed within the same, I secure to either rim a longitudinal plate, (46) by means of the screws (23) previously mentioned, having a downwardly extending flange (47); the two flanges coming sufficiently close to each other so as to leave not more than sufficient space between the same for the convenient handling of the wires. Where the device illustrated in Figure 5, that is, the stationary connecting unit, is used it is unnecessary, of course, to leave the entire slot open and in that case I cover the same with a suitable plate such as the plate (22) previously referred to except in those places which are desired to be left open ready for immediate use.

In Figure 6 is shown a connection between two tubes in the ceiling meeting each other at an angle and it is seen that for this purpose curved unit (51) is used allowing the carriage to move around the corner.

It will be readily understood that the idea involved in my invention may be expressed in a single unit as well as in the whole system described herein above. Such a single unit would practically serve the same purpose as the ordinary outlet box now commonly used and one form of the same is illustrated in Figure 9 in which one of my units is shown as being closed at either end and provided with flanges (52) adapted to be secured, for instance, to the laths of a plastered wall and with the rails as described herein before. It is covered by a suitable plate (53) two studs (54) engaging corresponding holes (56) and the plate carrying, enclosed by the insulating material (57) the sleeve (58) and the contacts (59) and being adapted to be secured in its place by means of the wing nut (61) in a manner similar to that illustrated in Figure 5. In the place of the plate (53) a plate (62) shown in detail in Figure 11 may be used which does not carry the sleeve (58) but is provided with two hinged gates (63) which when opened allow of sufficient space for the entrance of the transverse member (36). In the latter case the sleeve (58) with its transverse member (36) forms an independent part of the combination. When the two gates (63) are closed a pivoted drop gate (64) covers the joint between the same.

I claim:

1. An electric outlet of the character described, comprising a strip of metal bent transversely to present two confronting edges leaving a slot between the same, metallic tracks resting on but insulated from the edges connecting with a source of electrical energy, an insulating block adapted to be introduced through the slot lengthwise having contacts associated therewith adapted to engage the tracks when the block is disposed transversely and means for holding the block in an operative position comprising means for bridging the slot, a threaded member supported in the block extending through the bridging means and a nut engaging the end of the threaded member bearing against the bridging means.

2. An electric outlet of the character described, comprising a strip of metal bent transversely to present a shell having two confronting ledges leaving a slot between the same, electrical conductors disposed within the shell, an element arranged within the shell and disposed upon the inner faces of the ledges, and means for holding the element in an operative position comprising means for bridging the slot exteriorly, a threaded member supported in the element extending through a hole in the bridging means and a nut engaging the end of the threaded member bearing against the bridging means, the threaded member being hollow to serve as a conduit for outlet wires connected to the conductors.

3. An electric distributing system comprising a moulding open at the bottom and formed to present confronting ledges on opposite sides of the opening, a cover plate for the opening, track units comprising insulating bars and conducting rails seated thereon, made for introduction through the opening and for seating on the ledges, and means for securing either the insulating bars alone or the insulating bars and cover plates to the ledges.

4. An electrical distributing system comprising a moulding open at the bottom and formed to present confronting ledges on opposite sides of the opening, a cover plate for the opening, track units comprising insulating bars and conducting rails seated thereon, made for introduction through the opening and for seating on the ledges, strips adapted for engagement with the ledges for narrowing the opening and fastening means adapted to be used for securing either the cover plate or the track units and the strips to the ledges.

5. An electrical distributing system comprising a moulding open at the bottom and formed to present confronting ledges on opposite sides of the opening, a cover plate for the opening, insulating bars arranged upon the ledges, conducting rails supported by the insulating bars, and means for securing either the insulating bars alone or the insulating bars and cover plates to the ledges.

WILLIAM JAMES FISK.